(12) United States Patent
Kim et al.

(10) Patent No.: US 11,840,204 B2
(45) Date of Patent: Dec. 12, 2023

(54) CLEANER FOR LIDAR SENSOR

(71) Applicant: Hyundai Mobis Co., Ltd., Seoul (KR)

(72) Inventors: Kyung Rin Kim, Yongin-si (KR); Sung Eun Jo, Yongin-si (KR); Won Gyum Kim, Yongin-si (KR); Young Shin Kim, Yongin-si (KR); Min Jae Cho, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 1076 days.

(21) Appl. No.: 16/400,523

(22) Filed: May 1, 2019

(65) Prior Publication Data

US 2019/0351879 A1     Nov. 21, 2019

(30) Foreign Application Priority Data

May 15, 2018 (KR) .................... 10-2018-0055216

(51) Int. Cl.
| | |
|---|---|
| *B60S 1/54* | (2006.01) |
| *B60S 1/56* | (2006.01) |
| *G01K 1/14* | (2021.01) |
| *G01S 7/497* | (2006.01) |
| *G01S 17/931* | (2020.01) |

(52) U.S. Cl.
CPC .  *B60S 1/54* (2013.01); *B60S 1/56* (2013.01); *G01K 1/14* (2013.01); *G01S 7/497* (2013.01); *G01S 17/931* (2020.01); *G01S 2007/4977* (2013.01)

(58) Field of Classification Search
CPC ..... B60S 1/54; B60S 1/56; B08B 5/00; G01S 17/931; G01S 7/497; G01S 2007/4977; G01K 1/14
See application file for complete search history.

(56) References Cited

U.S. PATENT DOCUMENTS

| | | | |
|---|---|---|---|
| 9,297,901 B2 | 3/2016 | Bayha et al. | |
| 10,131,201 B1 * | 11/2018 | Yeomans | ........... B60H 1/00271 |
| 2014/0104426 A1 * | 4/2014 | Boegel | ........... B60R 1/10 |
| | | | 348/148 |
| 2017/0347395 A1 * | 11/2017 | Ghannam | ........... H05B 1/0236 |
| 2019/0210423 A1 * | 7/2019 | Ghannam | ........... B60H 1/00271 |
| 2019/0275991 A1 * | 9/2019 | Schmidt | ........... B60S 1/56 |

FOREIGN PATENT DOCUMENTS

| | | | | |
|---|---|---|---|---|
| DE | 102012015260 A1 * | 2/2013 | ........... G01S 7/032 |
| JP | 08-216654 | 8/1996 | | |
| JP | 2012-132988 | 7/2012 | | |
| JP | 2013-226871 | 11/2013 | | |
| KR | 10-2014-0103982 | 8/2014 | | |
| KR | 10-1678122 | 11/2016 | | |
| KR | 10-2017-0126136 | 11/2017 | | |

OTHER PUBLICATIONS

Translation of DE 102012015260 retrieved from Espacenet on Jul. 28, 2022 (Year: 2013).*
Office Action dated Oct. 27, 2021 for Korean Patent Application No. 10-2018-0055216.

* cited by examiner

*Primary Examiner* — Tom Rodgers
(74) *Attorney, Agent, or Firm* — H.C. Park & Associates, PLC

(57) ABSTRACT

A cleaner for a lidar sensor may include: a blast pipe unit through which wind generated from a fan of an engine passes; and a lidar sensor installed in the blast pipe unit, wherein foreign matter adhering to the surface of the lidar sensor are removed by wind discharged from the blast pipe unit.

5 Claims, 5 Drawing Sheets

CLEANER FOR LIDAR SENSOR

CROSS-REFERENCES TO RELATED APPLICATION

This application claims priority from and the benefit of Korean Patent Application No. 10-2018-0055216, filed on May 15, 2018, which is hereby incorporated by reference for all purposes as if set forth herein.

BACKGROUND

Field

Exemplary embodiments relate to a cleaner for a lidar (light or laser detection and ranging) sensor, and more particularly, to a cleaner for a lidar sensor capable of removing foreign matter adhering to a lidar sensor.

Discussion of the Background

In general, a lidar sensor or the like is used to determine environment information around a vehicle in operation. Such a sensor may be mounted on a vehicle bumper, and sense an object or structure by sensing the area at the front/rear of the vehicle. However, since such a sensor is exposed to the outside of the vehicle when mounted on the bumper, foreign matter such as dust may adhere to the surface of the sensor when the vehicle moves, thereby causing various problems. For example, the reliability of a measurement value of the sensor may be degraded, and the sensor may not recognize the surrounding environment. Therefore, there is a demand for a device capable of solving the problem.

The related art of the present invention is disclosed in Korean Patent Registration No. 10-1678122 registered on Nov. 15, 2016 and entitled "Omni-directional lidar".

The above information disclosed in this Background section is only for enhancement of understanding of the background of the invention and, therefore, it may contain information that does not constitute prior art.

SUMMARY

Exemplary embodiments of the present invention are directed to a cleaner for a lidar sensor capable of removing foreign matter adhering to a lidar sensor.

In one embodiment, a cleaner for a lidar sensor may include: a blast pipe unit through which wind generated from a fan of an engine passes; and a lidar sensor installed in the blast pipe unit, wherein foreign matter adhering to the surface of the lidar sensor are removed by wind discharged from the blast pipe unit.

The cleaner may further include a filter installed in the blast pipe unit, and configured to purify wind passing through the blast pipe unit.

The filter may be disposed across the inside of the blast pipe unit, such that top and bottom surfaces and left and right side surfaces thereof contact the entire inner surface of the blast pipe unit.

The cleaner may further include: a temperature measurement unit installed in the blast pipe unit, and configured to measure temperature of the wind passing through the blast pipe unit; an opening/closing unit installed in the blast pipe unit, and configured to open/close the inside of the blast pipe unit; and a control unit configured to control an operation of the opening/closing unit based on the temperature information of the wind, measured by the temperature measurement unit.

When the temperature of the wind, measured by the temperature measurement unit, is equal to or more than a preset temperature, the control unit may operate the opening/closing unit to close the inside of the blast pipe unit.

The blast pipe unit may include: a first blast pipe in which the filter and the temperature measurement unit are installed; a second blast pipe connected to the first blast pipe, including an outlet through which wind introduced from the first blast pipe is discharged, and having the lidar sensor installed thereon; and an installation unit extended inwardly from the first blast pipe, such that the opening/closing unit is slidably installed on the installation unit.

The second blast pipe may include: a second blast plate extended from the top of the first blast pipe so as to be inclined toward the lidar sensor; and a base plate extended forward from the bottom of the first blast pipe, and having the outlet formed therein.

The second blast pipe may further include a second blast guide plate extended from the second blast plate toward the lidar sensor.

The second blast guide plate may be disposed in parallel to the front surface of the lidar sensor.

In accordance with the embodiment of the present invention, the cleaner for a lidar sensor may discharge wind generated from the fan of the engine toward the lidar sensor through the blast pipe unit, thereby easily removing foreign matter adhering to the lidar sensor.

Furthermore, the wind may be purified through the filter installed in the blast pipe unit, which makes it possible to prevent the lidar sensor from being contaminated by the foreign matter included in the wind.

Furthermore, the temperature of the wind passing through the blast pipe unit can be correctly measured through the temperature measurement unit.

Furthermore, when the wind temperature measured by the temperature measurement unit is equal to or more than the preset temperature, the control unit may operate the opening/closing unit to close the inside of the blast pipe unit, thereby preventing a damage of the lidar sensor which may occur when the wind equal to or more than the preset temperature is discharged toward the lidar sensor.

Furthermore, the wind introduced from the second blast pipe in the first blast pipe may be easily moved through the second blast plate extended from the first blast pipe so as to be inclined toward the lidar sensor and the second blast guide plate extended from the second blast plate toward the lidar sensor, and then discharged toward the lidar sensor.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
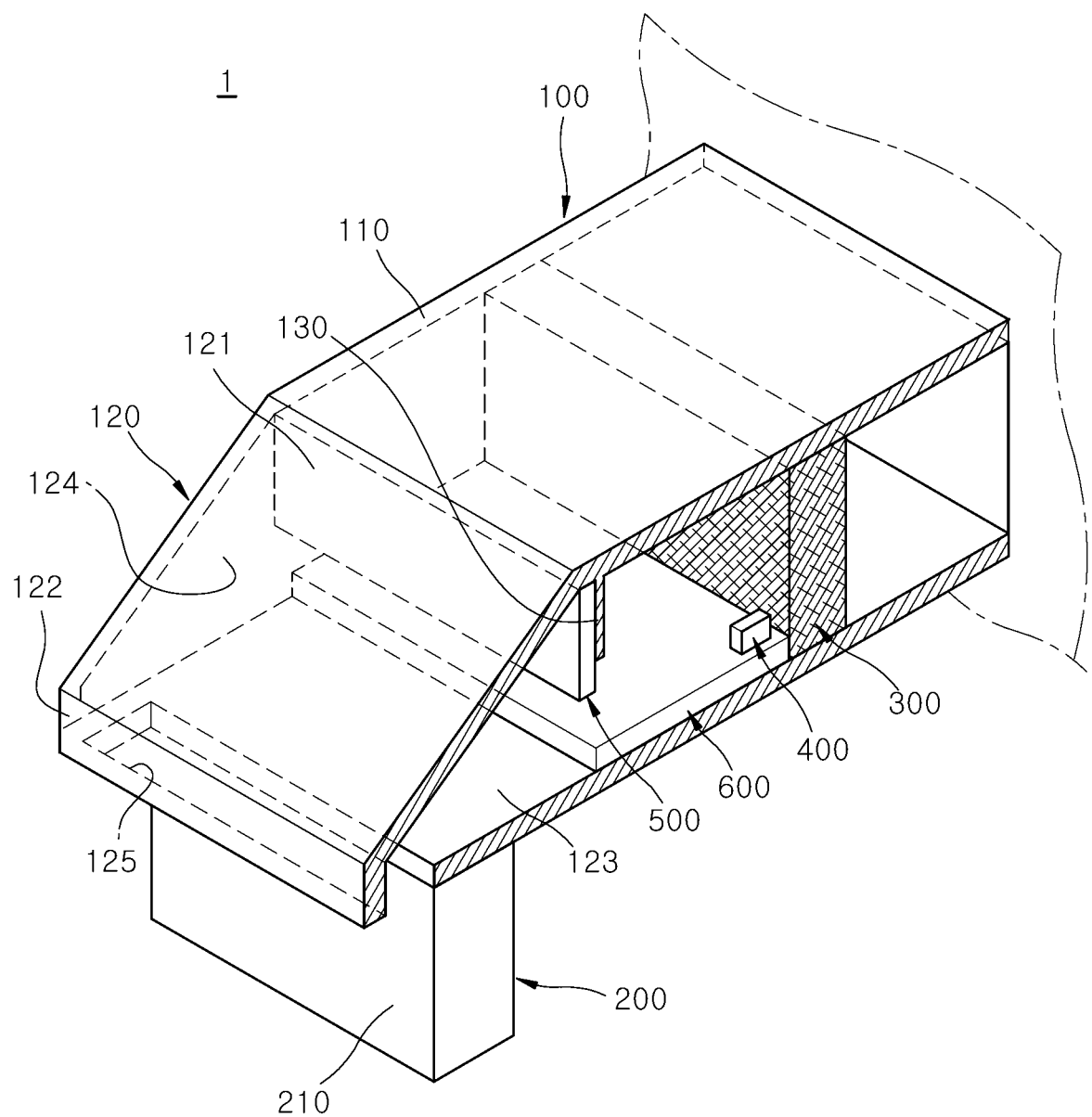
FIG. 1 is a perspective cross-sectional view of a cleaner for a lidar sensor in accordance with an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Figure 2:
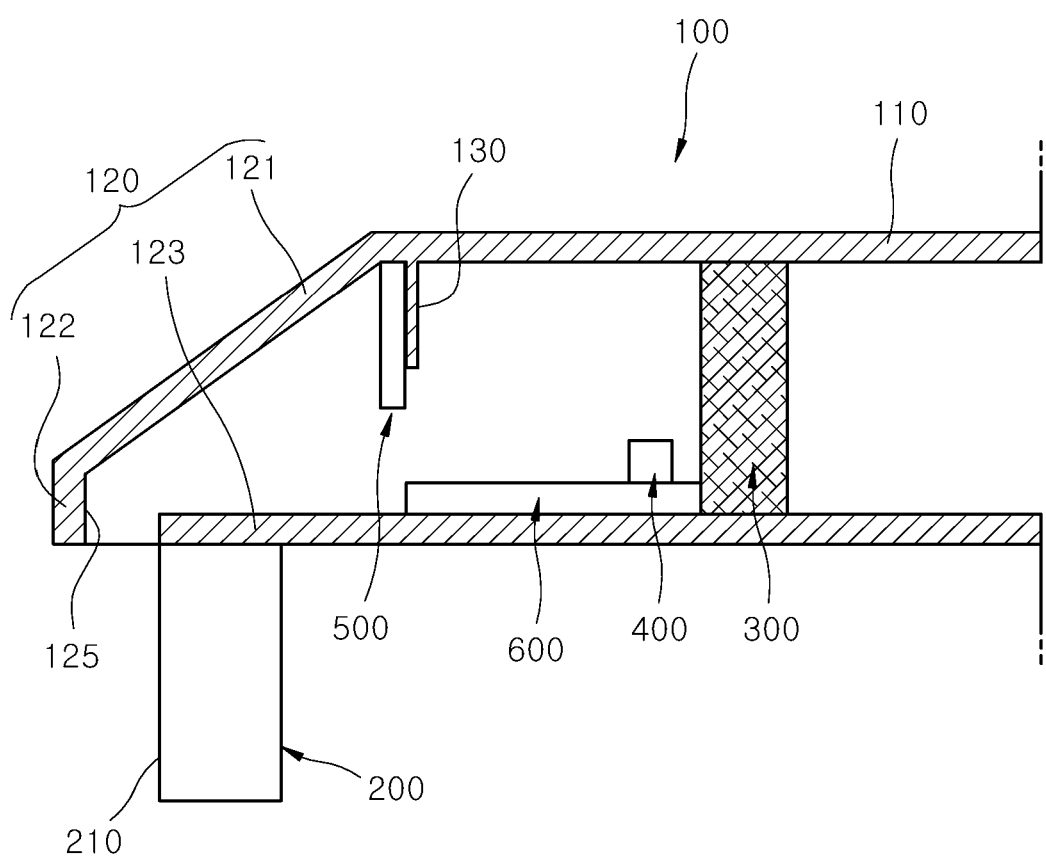
FIG. 2 is a cross-sectional view of the cleaner for a lidar sensor in accordance with the embodiment of the present invention.
Figure 3:
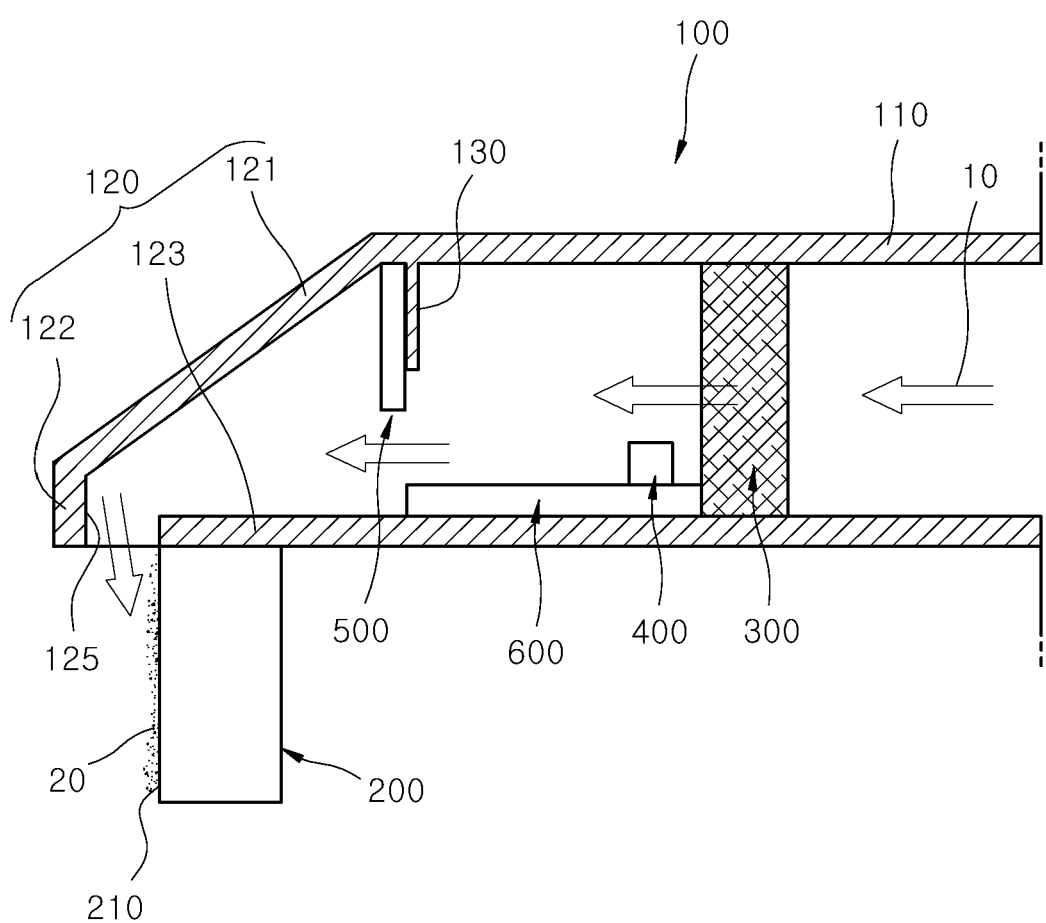
FIG. 3 illustrates that wind is introduced into a blast pipe unit of the cleaner for a lidar sensor in accordance with the embodiment of the present invention.
Figure 4:
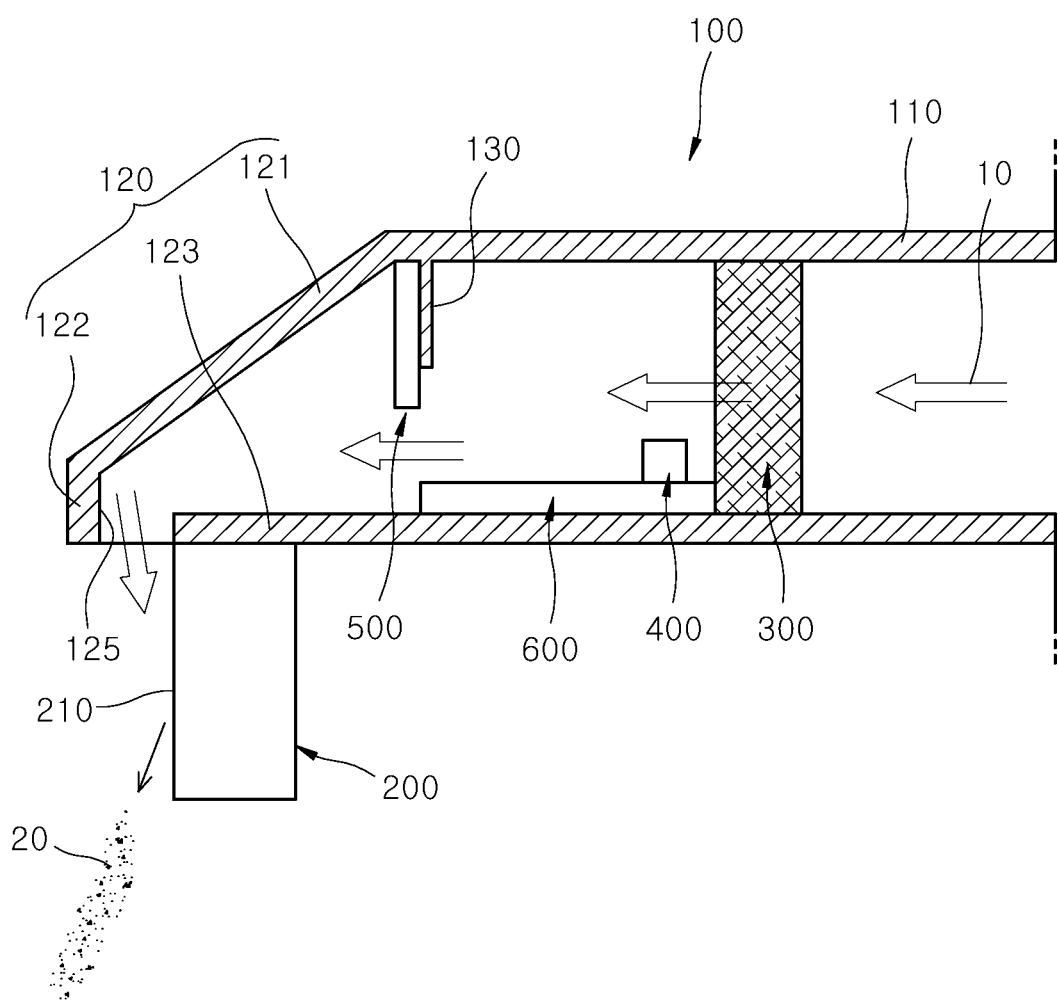
FIG. 4 illustrates that wind having passed through the blast pipe unit of the cleaner for a lidar sensor in accordance with the embodiment of the present invention is discharged to an outlet to remove foreign matter adhering to the surface of the sensor.
Figure 5:
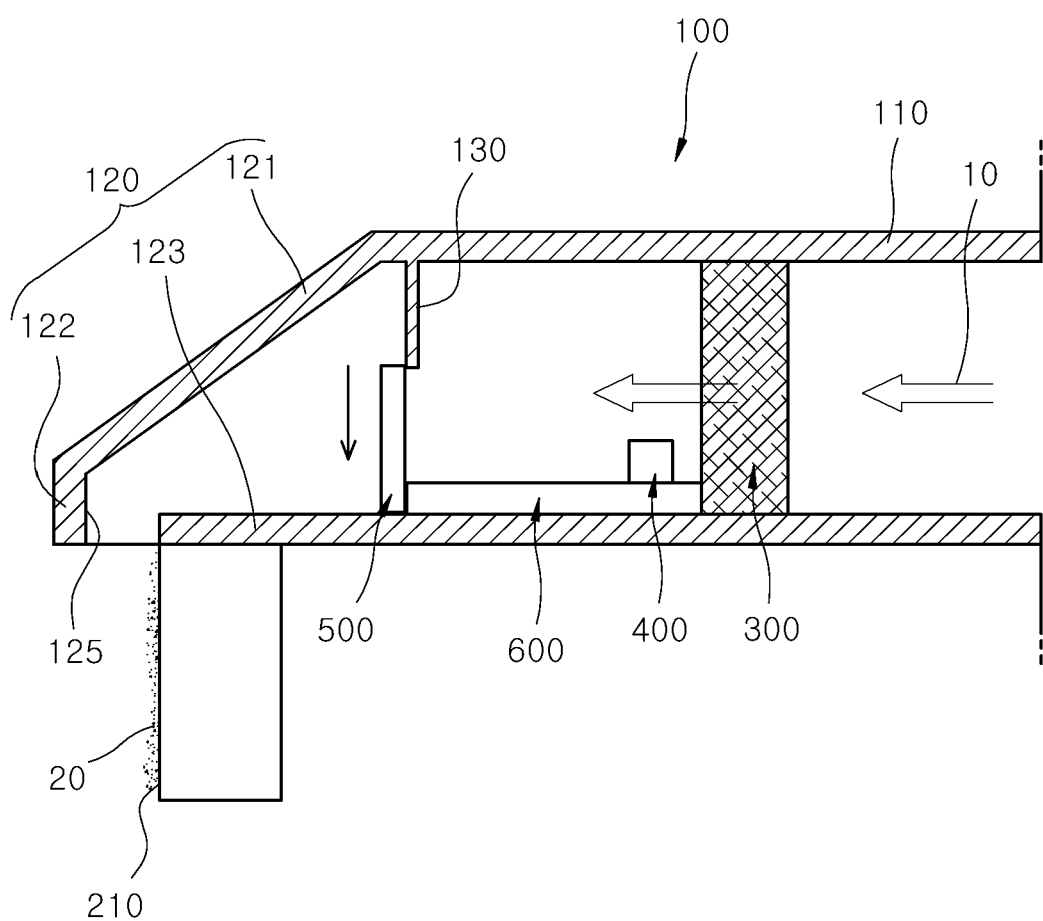
FIG. 5 illustrates that a controller operates an opening/closing unit to close the inside of the blast pipe unit, when wind temperature measured by a temperature measurement unit of the cleaner for a lidar sensor in accordance with the embodiment of the present invention is equal to or more than a preset temperature.

FIG. 1 is a perspective cross-sectional view of a cleaner for a lidar sensor in accordance with an embodiment of the present invention, FIG. 2 is a cross-sectional view of the cleaner for a lidar sensor in accordance with the embodiment of the present invention, FIG. 3 illustrates that wind is introduced into a blast pipe unit of the cleaner for a lidar sensor in accordance with the embodiment of the present invention, FIG. 4 illustrates that wind having passed through the blast pipe unit of the cleaner for a lidar sensor in accordance with the embodiment of the present invention is discharged to an outlet to remove foreign matter adhering to the surface of the sensor, and FIG. 5 illustrates that a controller operates an opening/closing unit to close the inside of the blast pipe unit, when wind temperature measured by a temperature measurement unit of the cleaner for a lidar sensor in accordance with the embodiment of the present invention is equal to or more than a preset temperature.

Referring to FIGS. 1 and 2, the cleaner 1 for a lidar sensor in accordance with the embodiment of the present invention may include a blast pipe unit 100 and a lidar sensor 200. Wind 10 generated from a fan of an engine may pass through the blast pipe unit 100. The wind 10 having passed through the blast pipe unit 100 may be discharged toward the lidar sensor 200 installed on the blast pipe unit 100.

The lidar sensor 200 may be installed on the blast pipe unit 100, and foreign matter 20 adhering to the surface of the lidar sensor 200 may be removed by the wind 10 discharged from the blast pipe unit 100. As illustrated in FIGS. 3 and 4, the lidar sensor 200 may be installed on the bottom surface (based on FIG. 3) of the blast pipe unit 100, and disposed at the rear (based on FIG. 3) of an outlet 125. Thus, the foreign matter 20 such as dust, adhering to the surface of the lidar sensor 200, i.e. a cover 210 of the lidar sensor 200, may be removed by the wind 10 discharged through the outlet 125 of the blast pipe unit 100 (refer to FIG. 4).

Specifically, the lidar sensor 200 may include a sensor body (not illustrated), a driver (not illustrated) and the cover 210. The sensor body may include a laser transmitter and a detector which are not illustrated. The driver may rotate the sensor body. The cover 210 may be coupled to the sensor body, protect the laser transmitter, the detector and the driver from outside, and have a hot wire. At this time, laser may be transmitted/received through the cover 210. Since the cover 210 has the hot wire, moisture or snow adhering to the cover 210 may be removed, but the foreign matter 20 such as dust may be difficult to remove.

In accordance with the present embodiment, the wind 10 discharged from the blast pipe unit 100 may remove the foreign matter 20 adhering to the cover 210, thereby prevent a reduction in function of the lidar sensor 200 due to the foreign matter 20 adhering to the cover 210.

The wind 10 may be discharged as hot wind toward the lidar sensor 200. When the vehicle is started, the fan of the engine may be rotated at the same time as the engine is driven. At this time, the wind 10 including heat of the engine, i.e. hot wind, may be generated. Thus, foreign matter 20 adhering to the cover 210 of the lidar sensor 200 can be more easily removed.

The cleaner 1 for a lidar sensor may further include a filter 300. The filter 300 may be installed in the blast pipe unit 100, and serve to purify the wind 10. The filter 300 may be disposed across the inside of the blast pipe unit 100 such that the top and bottom surfaces and the left and right side surfaces (based on FIG. 1) thereof contact the entire inner surface of the blast pipe unit 100. As a result, the wind 10 passing through the inside of the blast pipe unit 100 may be purified through the filter 300. Thus, the surface of the lidar sensor 200, i.e. the cover 210 of the lidar sensor 200, can be prevented from being contaminated by the foreign matter 20 included in the wind 10.

The cleaner 1 for a lidar sensor may include a temperature measurement unit 400, an opening/closing unit 500 and a control unit 600. The temperature measurement unit 400 may be installed in the blast pipe unit 100, and serve to measure the temperature of the wind 10. The temperature measurement unit 400 may be disposed in front of the filter 300 so as to measure the temperature of the wind 10, and transfer the measured temperature information of the wind 10 to the control unit 600.

The opening/closing unit 500 may be installed in the blast pipe unit 100 and serve to open/close the blast pipe unit 100. At this time, the opening/closing unit 500 may be disposed in front of the temperature measurement unit 400. The opening/closing unit 500 may be installed in the blast pipe unit 100 so as to move in the top-to-bottom direction (see FIG. 5), and open/close the inside of the blast pipe unit 100 depending on situations.

The control unit 600 may be installed in the blast pipe unit 100, receive the measured temperature information of the wind 10 from the temperature measurement unit 400, and control the operation of the opening/closing unit 500 based on the temperature information of the wind 10. The control unit 600 may operate the opening/closing unit 500 to close the inside of the blast pipe unit 100 when the temperature of the wind 10, measured by the temperature measurement unit 400, is equal to or more than a preset temperature.

Specifically, the control unit 600 may determine whether the temperature of the wind 10, received from the temperature measurement unit 400, is equal to or more than the preset temperature. When the temperature of the wind 10, received by the control unit 600, is equal to or more than the preset temperature, the control unit 600 may operate the opening/closing unit 500 to close the inside of the blast pipe unit 100 (see FIG. 5).

Therefore, the wind 10 of which the temperature is equal to or more than the preset temperature may be prevented from being discharged to the lidar sensor 200 through the blast pipe unit 100, which makes it possible to prevent the lidar sensor 200 from being damaged by the wind 10 of which the temperature is equal to or more than the preset temperature.

The blast pipe unit 100 may include a first blast pipe 110, a second blast pipe 120 and an installation unit 130.

The first blast pipe 110 through which the wind 10 passes may include the filter 300, the temperature measurement unit 400 and the opening/closing unit 500 which are installed therein.

The second blast pipe 120 may be connected to the first blast pipe 110. The second blast pipe 120 may have an outlet 125 formed at the bottom surface (based on FIG. 3) thereof, such that the wind 10 introduced from the first blast pipe 110 is discharged through the outlet 125. The lidar sensor 200 may be installed adjacent to the outlet 125. As illustrated in FIG. 3, the lidar sensor 200 may be installed on the bottom surface (based on FIG. 3) of the second blast pipe 120, and disposed at the rear (based on FIG. 3) of the outlet 125.

The installation unit 130 may be extended inwardly from the first blast pipe 110, and the opening/closing unit 500 may be slidably installed on the installation unit 130. The opening/closing unit 500 may open/close the inside of the blast pipe unit 100 while slid on the installation unit 130 in the top-to-bottom direction (based on FIG. 5) by the control unit 600.

The second blast pipe 120 may include a second blast plate 121. The second blast plate 121 may be extended from the first blast pipe 110 so as to be inclined toward the lidar sensor 200.

The second blast pipe 120 may include a second blast guide plate 122, a base plate 123 and a connection plate 124. The second blast guide plate 122 may be extended from the second blast plate 121 toward the lidar sensor 200 so as to be disposed in parallel to the front surface of the lidar sensor 200. The base plate 123 may be extended forward from the bottom of the first blast pipe 110, disposed facing the second blast plate 121, and have the outlet 125 formed therein. The connection plate 124 may connect the base plate 123 and the second blast plate 121.

As described above, the second blast pipe 120 may include the second blast plate 121 extended from the top of the first blast pipe 110 so as to be inclined toward the lidar sensor 200 and the second blast guide plate 122 extended from the second blast plate 121 toward the lidar sensor 200. Therefore, the wind 10 introduced from the second blast pipe 120 in the first blast pipe 110 may be easily moved to the outlet 125 and discharged toward the lidar sensor 200.

Hereafter, referring to FIGS. 3 to 5, the operation and effect of the cleaner for a lidar sensor in accordance with the embodiment of the present invention will be described.

When the vehicle is started, the fan of the engine may be rotated as the same time as the engine is driven. When the fan of the engine is rotated, the wind 10 including heat of the engine, i.e. hot wind, may be generated. The wind 10 generated in such a manner may be discharged toward the lidar sensor 200 through the blast pipe unit 100, and remove the foreign matter 20 adhering to the surface of the lidar sensor 200, i.e. the cover 210 of the lidar sensor 200 (see FIGS. 3 and 4). Thus, it is possible to prevent a reduction in function of the lidar sensor 200 due to the foreign matter 20 adhering to the cover 210 of the lidar sensor 200.

During this process, the temperature measurement unit 400 installed in the blast pipe unit 100 may measure the temperature of the wind 10 and transfer the measurement information to the control unit 600. The control unit 600 may determine whether the temperature of the wind 10, received from the temperature measurement unit 400, is equal to or more than a preset temperature.

When the temperature of the wind 10, received by the control unit 600, is equal to or more than the preset temperature, the control unit 600 may operate the opening/closing unit 500 to close the inside of the blast pipe unit 100 (see FIG. 5). Therefore, the wind 10 of which the temperature is equal to or more than the preset temperature may be blocked from being discharged to the outlet 125 through the blast pipe unit 100. As a result, it is possible to prevent a damage of the lidar sensor 200, which may occur when the wind 10 of which the temperature is equal to or more than the preset temperature is discharged to the outlet.

As such, the cleaner in accordance with the embodiment of the present invention can effectively remove foreign matter 20 adhering to the surface of the lidar sensor 200 using the wind 10 which is generated when the fan of the engine is rotated. Furthermore, the cleaner can block the discharge of the wind 10 when the temperature of the wind 10 is equal to or more than the preset temperature, thereby preventing a damage of the lidar sensor 200.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A cleaner for a lidar sensor, comprising:
a blast pipe unit through which wind generated from a fan that an engine powers passes; and
the lidar sensor attached to the blast pipe unit, wherein foreign matter adhering to a surface of the lidar sensor is removed by the wind discharged from the blast pipe unit,
wherein the blast pipe unit comprises:
a first blast pipe in which a filter and a temperature measurement unit are installed;
a second blast pipe connected to the first blast pipe and extending downwards towards the lidar sensor, the second blast pipe comprises an outlet through which wind introduced from the first blast pipe is discharged, and the lidar sensor is installed on the outlet,
wherein the second blast pipe further comprises:
a second blast plate extended from a top of the first blast pipe to be inclined toward the lidar sensor,
a second blast guide plate extended from the second blast plate toward the lidar sensor;
a base plate extended forward from a bottom of the first blast pipe and disposed facing the second blast guide plate; and
a connection plate that connects the base plate and the second blast plate,
wherein the base plate has the outlet formed therein,
wherein the lidar sensor is disposed at a rear of the outlet, and
wherein the second blast guide plate is disposed in parallel to a front surface of the lidar sensor on which a window is disposed, the second blast guide plate guiding the wind exiting from the second blast pipe across the front surface of the lidar sensor so as to clean the front surface of the lidar sensor of debris,
wherein the temperature measurement unit is configured to measure temperature of the wind passing through the blast pipe unit,
the cleaner further comprising:
an opening or closing unit installed in the blast pipe unit, and configured to open or close an inside of the blast pipe unit; and
a control unit configured to control an operation of the opening or closing unit based on the temperature of the wind,
wherein when the temperature of the wind is equal to or more than a preset temperature, the control unit is configured to operate the opening or closing unit to close the inside of the blast pipe unit.

2. The cleaner of claim 1, wherein the filter is configured to purify the wind passing through the blast pipe unit.

3. The cleaner of claim 2, wherein the filter is disposed across an inside of the first blast pipe, such that top and bottom surfaces and left and right side surfaces of the filter contact an entire inner surface of the first blast pipe.

4. The cleaner of claim 1, wherein the blast pipe unit further comprises:
an installation unit extended inwardly from the first blast pipe, such that the opening or closing unit is slidably installed on the installation unit.

5. A cleaner for a lidar sensor, comprising:
a blast pipe unit through which wind generated from a fan that an engine powers passes; and
the lidar sensor attached to a bottom surface of the blast pipe unit, wherein foreign matter adhering to a surface of the lidar sensor are removed by the wind discharged from an opening in the bottom surface of the blast pipe unit and thereby flows across a front surface of the lidar sensor,
wherein the blast pipe unit comprises:
a first blast pipe in which a filter and a temperature measurement unit are installed;
a second blast pipe connected to the first blast pipe and extending downwards towards the lidar sensor, the second blast pipe comprises an outlet through which wind introduced from the first blast pipe is discharged, and the lidar sensor is installed on the outlet,
wherein the second blast pipe further comprises:
a second blast guide plate extended from a second blast plate toward the lidar sensor;
a base plate extended forward from a bottom of the first blast pipe and disposed facing the second blast guide plate; and
a connection plate that connects the base plate and the second blast plate,
wherein the base plate has the outlet formed therein,
wherein the lidar sensor is disposed at a rear of the outlet, and
wherein the second blast guide plate is disposed in parallel to a front surface of the lidar sensor on which a window is disposed, the second blast guide plate guiding the wind exiting from the second blast pipe across the front surface of the lidar sensor so as to clean the front surface of the lidar sensor of debris,
wherein the temperature measurement unit is configured to measure temperature of the wind passing through the blast pipe unit,
the cleaner further comprising:
an opening or closing unit installed in the blast pipe unit, and configured to open or close an inside of the blast pipe unit; and
a control unit configured to control an operation of the opening or closing unit based on the temperature of the wind,
wherein when the temperature of the wind is equal to or more than a preset temperature, the control unit is configured to operate the opening or closing unit to close the inside of the blast pipe unit.

* * * * *